(12) United States Patent
Coban et al.

(10) Patent No.: US 8,346,202 B2
(45) Date of Patent: Jan. 1, 2013

(54) DIGITAL INTENSIVE BASEBAND CHAIN OF A RECEIVER

(75) Inventors: Abdulkerim L. Coban, Austin, TX (US); Aslamali A. Rafi, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 260 days.

(21) Appl. No.: 12/824,910

(22) Filed: Jun. 28, 2010

(65) Prior Publication Data

US 2011/0317077 A1  Dec. 29, 2011

(51) Int. Cl.
*H04B 1/16* (2006.01)
*H04N 5/44* (2011.01)

(52) U.S. Cl. .................. 455/334; 455/183.1; 348/725

(58) Field of Classification Search ............... 455/183.1, 455/334, 150.1, 189.1, 190.1; 348/725, 726, 348/731
See application file for complete search history.

(56) References Cited

U.S. PATENT DOCUMENTS

| | | | |
|---|---|---|---|
| 5,826,180 A * | 10/1998 | Golan | 455/302 |
| 5,982,457 A | 11/1999 | Limberg | |
| 6,369,857 B1 | 4/2002 | Balaban et al. | |
| 6,778,117 B1 * | 8/2004 | Johnson | 341/144 |
| 7,075,585 B2 | 7/2006 | Favrat et al. | |
| 7,120,413 B2 * | 10/2006 | Lee et al. | 455/260 |
| 7,206,025 B2 | 4/2007 | Choi | |
| 7,239,264 B2 | 7/2007 | Cherniakov | |
| 7,265,792 B2 | 9/2007 | Favrat et al. | |
| 7,369,835 B2 | 5/2008 | Margairas et al. | |
| 7,425,995 B2 * | 9/2008 | Johnson | 348/725 |
| 7,447,493 B2 * | 11/2008 | Johnson | 455/334 |
| 7,477,325 B2 | 1/2009 | Zhu et al. | |
| 7,477,326 B2 | 1/2009 | Jaffe | |
| 7,548,742 B2 * | 6/2009 | Johnson | 455/313 |
| 7,558,546 B2 * | 7/2009 | Johnson et al. | 455/182.3 |
| 7,675,996 B2 * | 3/2010 | Johnson et al. | 375/316 |
| 2002/0003586 A1 | 1/2002 | Busson et al. | |
| 2004/0259512 A1 | 12/2004 | Busson et al. | |
| 2005/0036073 A1 | 2/2005 | Bae et al. | |
| 2005/0265486 A1 | 12/2005 | Crawley | |
| 2006/0222115 A1 | 10/2006 | Dornbusch et al. | |
| 2007/0080840 A1 | 4/2007 | Ruitenburg | |

(Continued)

FOREIGN PATENT DOCUMENTS
WO  WO 03/067877  8/2003

OTHER PUBLICATIONS

Philips, "Integrated Circuits, Data Sheet, TDA8060Ts, Satellite ZERO-IF QPSK down-converter," Nov. 11, 1999, 16 pages.

(Continued)

*Primary Examiner* — Sonny Trinh
(74) *Attorney, Agent, or Firm* — Trop, Pruner & Hu, P.C.

(57) ABSTRACT

In one embodiment, the present invention is directed to an apparatus configured to perform channel filtering operations digitally, to reduce area and power consumption as compared to analog filtering. After passive filtering of downconverted analog baseband signals, the signals are provided to digitization circuitry to convert the filtered baseband signals into digital signals. Then a digital circuit, which may be implemented as a digital signal processor (DSP), may channel filter the digital signals and provide the filtered digital signals to conversion circuitry to convert the channel filtered digital signals back to analog signals.

20 Claims, 4 Drawing Sheets

U.S. PATENT DOCUMENTS

2007/0287402 A1 12/2007 Feng et al.
2009/0213275 A1 8/2009 Trager
2010/0130153 A1 5/2010 Poorfard et al.
2010/0328544 A1 12/2010 Hendrickson

OTHER PUBLICATIONS

CONEXANT, "CX24108, Digital Satellite Tuner, Data Sheet," Nov. 2000, 35 pages.
Philips, "TDA8262HN, Fully Integrated Satellite Tuner, Product Data Sheet" Rev.01, Dec. 14, 2004, 30 pages.
Mats Hovin, et al., "Delta-Sigma Modulators Using Frequency-Modulated Intermediate Values," vol. 32, No. 1, Jan. 1997, pp. 13-22.
Frank Opteynde, "25.1 A Maximally-Digital Radio Receiver Front-End," ISSCC 2010/Session 25/Wireless Connectivity/25.1, pp. 450-451.
Gerry Taylor, et al., "16.4 A Mostly Digital Variable-Rate Continous-Time ADC Modulator," ISSCC 2010/Session 16/High-Performance Data Converters/16,4, pp. 298-300.
ZARLINK Semiconductor, "ZL10038, Advanced Modulation Satellite Tuner, Data Sheet," Jul. 2004, pp. 1-42.
MAXIM, "Complete, Direct-Conversion Tuner for DVB-S2 Applications, MAX2112," Rev. 1, Dec. 2007, pp. 1-20.
Micronas, "DRX 3960A Digital Receiver Front-End," Feb. 8, 2001, pp. 1-30.
NXP, "TDA 8295 Digital Global Standard Low IF Demodulator for Analog TV and FM Radio," Feb. 4, 2008, pp. 1-77.
XCEIVE, "Welcome to Xceive at CES 2007, Upgrade Your Tuner! Get XC5000," 2007, pp. 1-28.
XCEIVE, "XC5000 Product Brief," Dec. 2006, pp. 1-2.
U.S. Appl. No. 12/551,146, filed Aug. 31, 2009, entitled, "Digital Phase Lock Loop Configurable As a Frequency Estimator," by Li Gao, et al.

* cited by examiner

US 8,346,202 B2

DIGITAL INTENSIVE BASEBAND CHAIN OF A RECEIVER

BACKGROUND

Historically, televisions were formed of discrete analog components that received over-the-air channels and processed the received signals into video and audio signals for display and output from a television. As time has passed, television tuners and receivers are moving to more semiconductor-based technologies. This is especially so in light of the recent move to digital broadcasting and high-definition content.

Signals can be received in a television in various ways, including over-the-air (or terrestrial), cable, satellite or in other manners. Different standards exist for different types of the signals. With regard to satellite television, a typical receive path includes a tuner to receive the signals from an antenna and to downconvert the signals to baseband. Such a tuner can be a single chip tuner that receives and processes the signals into analog baseband signals for output to downstream circuitry, namely another semiconductor chip, which may be a demodulator. In general, all of the signal processing done in the tuner chip is performed in the analog domain. While such a design is relatively inexpensive, the size and power consumption of the chip can be relatively significant as certain circuitry, especially filtering circuitry, can require higher order complex filters. Furthermore, due to the analog baseband chain of such tuner, various analog compensations are needed to form an output baseband signal that is appropriate for demodulation in downstream circuitry.

SUMMARY OF INVENTION

One aspect of the present invention is directed to an apparatus that includes various circuitry and is configured to perform channel filtering operations digitally, to reduce area and power consumption as compared to analog filtering. According to this aspect, the apparatus includes a mixer to downconvert incoming radio frequency (RF) signals to complex baseband signals, one or more programmable gain amplifiers (PGAs) coupled to the mixer to receive and amplify complex baseband signals, one or more passive filters coupled to the PGA(s) to filter the amplified complex baseband signals, digitization circuitry to convert the filtered baseband signals into digital complex signals, and a digital circuit, which may be implemented as a digital signal processor (DSP). The digital circuit may channel filter the digital complex signals, and provide them to conversion circuitry to convert the channel filtered digital complex signals to analog signals. In turn, output buffer circuitry can buffer the analog signals for output, where they may be provided to, e.g., an off-chip demodulator.

In various embodiments, in addition to channel filtering, the digital circuit can perform various compensation operations. For example, the DSP may further perform one or more of DC offset correction, droop compensation, and group delay compensation. To this end, in one embodiment, the DSP can include a decimation filter to decimate the digital complex signals, a DC offset compensation circuit to compensate for a DC offset, a channel filter to filter the DC offset compensation circuit output, and a droop and group delay compensation circuit to receive and compensate the channel filter output.

Yet another aspect of the present invention is directed to a satellite television tuner having an analog front end including a mixer to downconvert incoming RF signals to complex baseband signals, one or more PGAs coupled to the mixer to receive and amplify complex baseband signals, and one or more second-order anti-aliasing filters coupled to the PGA(s) to filter the amplified complex baseband signals. In turn, an analog-to-digital converter (ADC) may convert the filtered complex baseband signals into digital complex signals, where the ADC has a resolution of less than approximately 9 bits. Then a DSP coupled to the ADC and including a decimation filter, a DC offset compensation circuit, a channel filter, and a droop and group delay compensation circuit can receive and process the digital complex signals. The tuner may further include a digital-to-analog converter (DAC) coupled to the DSP to convert the compensated channel filter output to analog signals, where the DAC has a resolution of less than approximately 8 bits. Finally, an analog back end may include an output buffer to buffer the analog signals for output from the tuner, which may be formed on a single semiconductor die.

A still further aspect of the present invention is directed to a method for digitally filtering signals to reduce power consumption. The method includes downconverting an incoming RF signal to complex baseband signals in a complex mixer of a satellite tuner, filtering the complex baseband signals in one or more passive filters, converting the filtered complex baseband signals into digital complex signals, channel filtering the digital complex signals in a DSP, converting the channel filtered digital complex signals to analog signals, and outputting the analog signals from the satellite tuner.

DETAILED DESCRIPTION

In various embodiments, a television tuner can perform a significant amount of its tuner processing in the digital domain. In this way, reduced constraints can be realized for the analog circuitry of the tuner, as the channel filtering in various embodiments can be performed digitally. After digital processing to obtain a tuned signal suitable for demodulation, a conversion back to the analog domain may occur such that available downstream circuitry can demodulate the digitally processed signals. As described herein, a tuner may be in the context of a satellite television system, however, the scope of the present invention is not limited in this regard, and embodiments are equally applicable to other television systems as well as other wireless devices.

Figure 1:
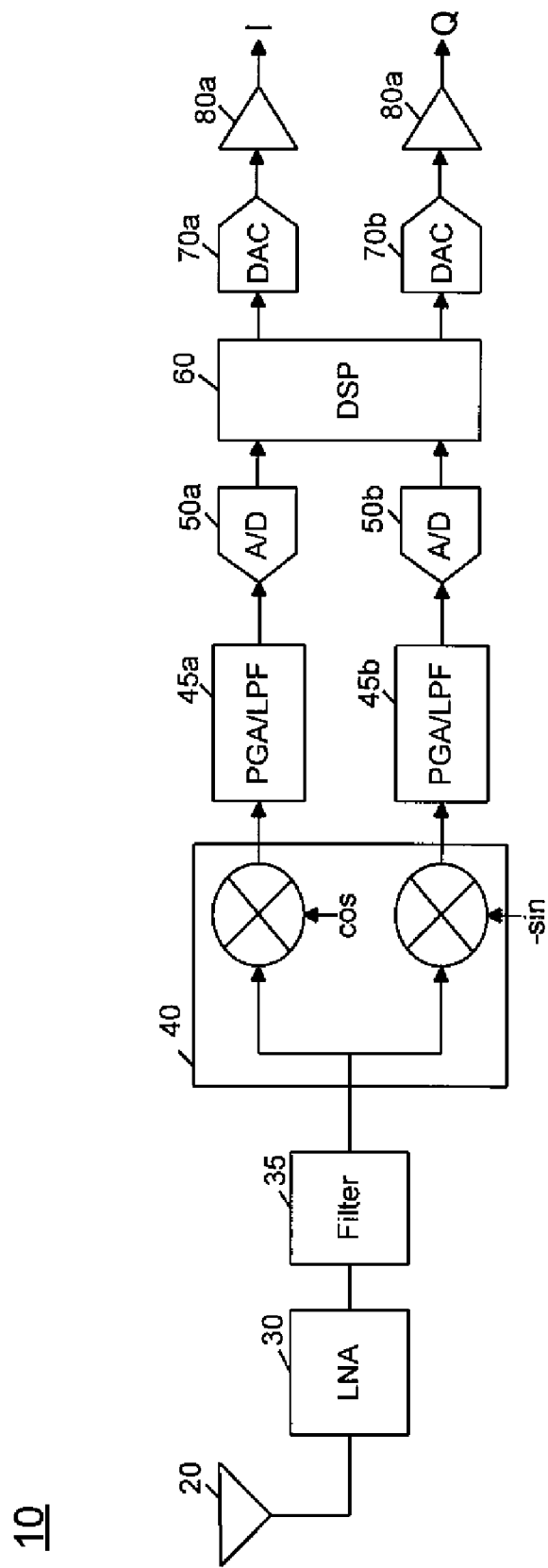
FIG. 1 is a block diagram of a tuner in accordance with one embodiment of the present invention.

Referring now to FIG. 1, shown is a block diagram of a tuner in accordance with one embodiment of the present invention. In various implementations, tuner 10 may be a single chip integrated circuit such as a single die CMOS circuit that acts as a tuner for receiving signals of a given radio frequency (RF). In various embodiments, tuner 10 may be a television tuner that can be used to receive incoming RF signals, e.g., for a satellite system. However, the scope of the present invention is not limited in this regard, and in other embodiments a receiver can be used in connection with other TV tuners such as terrestrial or cable tuners, and other wireless receivers such as for wireless communication within short range or long range wireless systems, such as a local area network or wide area network. In general, tuner 10 includes both analog and digital circuitry. As discussed above, by performing at least certain operations digitally, reduced area and power consumption can be realized.

As seen, incoming signals, which may be RF signals received over the air or in another manner, may be received by an antenna 20 that in turn is coupled to a low noise amplifier (LNA) 30. LNA 30 is in turn coupled to a filter 35. In various embodiments, filter 35 may be a tracking filter, bandpass filter or other such filter, depending on a given implementation.

The filtered and amplified RF signals are then provided to a mixer 40, which may be a complex mixer to downconvert the signals to a lower frequency. While the scope of the present invention is not limited in this regard, mixer 40 may downconvert the signals to an intermediate frequency (IF), a zero IF (ZIF), or baseband, depending on a desired implementation. To effect frequency conversion to these different frequency ranges, a selected one of multiple local oscillator signals may be provided to the complex mixer. For purposes of discussion herein, assume that mixer 40 downconverts incoming RF signals to baseband, however the scope of the present invention is not limited in this regard.

Given the complex mixer, the output of the mixer may be complex signals, namely I and Q signals provided on I and Q signal paths. As seen, the baseband complex signals are provided to corresponding programmable gain amplifiers/low pass filters $45_a$-$45_b$. As will be discussed further below, given that various filtering and other processing can be performed digitally, the complexity of such PGA and LPF can be reduced. For example, the PGA can be implemented using coarser steps to enable a design having fewer design constraints and size. Similarly, the filtering performed by the LPF can be passive filtering in which anti-aliasing is performed. However, the need for active filtering can be avoided and a relatively simple passive filter can be used, reducing implementation costs, size and complexity. This is so, as channel filtering can instead be performed within digital circuitry. That is, in satellite systems, blockers are typically not strong. Therefore, the reason why a high-order filter is needed in conventional all-analog satellite tuners is mainly due to the anti-aliasing requirements of the following digitization circuitry that resides in the front-end of a following demodulator chip, rather than for reducing the blockers. Of course any reduction in blocker power helps reduce digitizer dynamic range but this may be a secondary benefit. In demodulators, sampling rates can be relatively low, forcing strong filtering in the tuner chip. Because embodiments can operate a digitizer at high frequencies (e.g., greater than 800 megahertz (MHz)), the anti-aliasing requirements are relaxed.

As further seen in FIG. 1, the outputs of blocks 45 may be provided to corresponding digitizers, namely analog-to-digital converters (ADCs) $50_a$ and $50_b$. As will be described further below, these ADCs may operate at relatively low dynamic range but at high speeds (to achieve required dynamic range with small area and low power while relaxing the anti-aliasing filter) to provide digital samples to a digital signal processor (DSP) 60. In DSP 60, various filtering including channel filtering and other processing can be performed on the incoming digital signals. By performing such processing digitally, improvements in area and power consumption can be realized. After the digital processing occurs, the processed digital signals are provided to corresponding digital-to-analog converters (DACs) $70_a$ and $70_b$. There, the signals are converted back to analog signals that are provided to corresponding output buffers $80_a$ and $80_b$, which may drive the signals off-chip to downstream circuitry such as a demodulator implemented in a separate integrated circuit. While shown with this high-level implementation in the embodiment of FIG. 1, understand the scope of the present invention is not limited in this regard.

Figure 2:
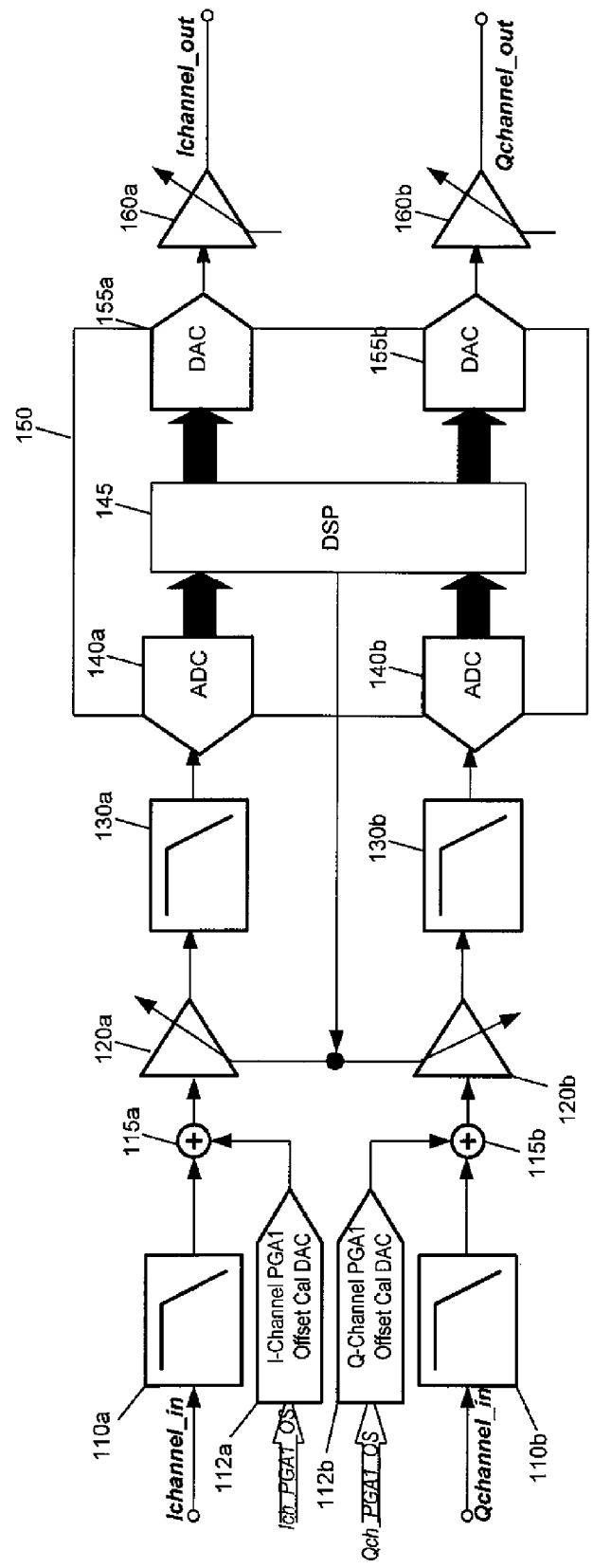
FIG. 2 is a more detailed block diagram of a tuner in accordance with an embodiment of the present invention.

Further details regarding a receiver path can be seen in FIG. 2, which is a more detailed block diagram of a receiver in accordance with an embodiment of the present invention. As seen in FIG. 2, only a downconverted portion of receiver 100 is shown. Specifically, the incoming I and Q channel signals have already been downconverted. These downconverted signals may be outputs of mixers, and which are provided to corresponding filters $110_a$ and $110_b$, which, in one embodiment may be first-order passive LPFs implemented as relatively simple RC filters. Note that these filters may actually be implemented as part of the mixer itself, namely as a mixer load. The filtered signals are provided to corresponding summing blocks $115_a$ and $115_b$. Such blocks may sum the filtered signals with an offset correction value. That is, offsets can be introduced in the analog front end of the tuner, e.g., due to mismatches in the mixer or other analog portions of the tuner. The offset correction values provided to summing blocks 115 may be received via calibration DACs $112_a$ and $112_b$ which receive digital offset signals, e.g., from digital circuitry such as a microcontroller (MCU), DSP or other control circuitry. This offset signal may be optional in some embodiments, and may be used to provide a coarse offset correction to prevent signal corruption such as clipping and to avoid ADC overload for the downstream components.

From summing blocks 115, the corresponding signals can be provided to PGAs $120_a$ and $120_b$. Note that in many embodiments, the summing blocks can be embedded in the PGAs. As discussed above, these PGAs can be designed with fewer constraints, given the presence of downstream digital circuitry. These PGAs may be controlled by an AGC loop, which may be a feedback loop to receive the incoming signals at one or more points of the signal path and to programmably control gain based on the measured values. In one embodiment, the PGAs may be controlled with coarse analog steps. For example, in one embodiment the coarse steps may be discrete steps of, e.g., 0, 6 and 12 dB. In other embodiments, the coarse steps may be 1 dB steps. Furthermore, rather than continuous-time control, embodiments can implement a discrete time AGC control of the amplifiers, relaxing constraints. Any fine gain step adjustment can be done digitally.

The gain compensated signals in turn may be provided to filters $130_a$ and $130_b$. As discussed above, these filters may be implemented as passive anti-aliasing low pass filters, given high ADC sampling frequency and the presence of the digital downstream circuitry. In one embodiment, these filters may be implemented as second-order passive RC filters. Such low pass filters may reduce blocker power and also provide anti-aliasing. That is, although blockers may be present having a relatively large power, e.g., a power level that would require a much larger dynamic range of 12 bits, due to the downstream digital circuitry, the full bandwidth of the blockers need not be blocked and can be passed for complete filtering in the downstream circuitry.

In contrast, in conventional receivers such filtering would be with a higher order filter. Although such a filter can promote stronger filtering, it is at the cost of more area and power consumption. Furthermore, with a high-order filter, there can be a relatively large RC corner frequency variation, and due to process shifts, the bandwidth may be set larger than a bandwidth of a signal of interest to ensure that the desired signal is still within the filter. But by having a wider bandwidth, more blockers may be passed as well. As an example, typically a conventional LPF for satellite TV tuners may have a programmable corner frequency of between 4 MHz to 40 MHz. For a channel bandwidth of 30 MHz, the corner frequency is set to 33 MHz (10% higher) to account for process variations. However, using an embodiment of the present invention with digital channel filtering, the corner frequency can be precisely set, e.g., at 30 MHz. By providing digital filtering and compensation in accordance with an embodiment of the present invention, a cleaner spectrum can be provided off-chip to downstream circuitry.

The filtered signals may then be provided to a digital section 150 which generally includes digitization circuitry, DSP circuitry and conversion circuitry. As seen, the filtered signals may be provided to corresponding ADCs 140$_a$ and 140$_b$, which may have small area and power overhead. Different types of ADCs may be implemented. For example, a voltage control oscillator (VCO)-based ADC, or a continuous-time sigma-delta converter such as a first-order continuous-time multi-bit converter may be used.

As discussed above, in various implementations a tuner in accordance with an embodiment may be used for a satellite system. In such a system, the bandwidth of interest is relatively wide and signal-to-noise ratio (SNR) requirements are moderate. Accordingly, the ADCs may be implemented having a relatively few number of bits of dynamic range. While the scope of the present invention is not limited in this regard, in some implementations the ADCs may be implemented having a dynamic range of between approximately 4-10 bits and in some embodiments may be of less than 9 bits. As examples, low overhead VCO based or continuous-time sigma-delta converters of relatively small area and low power consumption, e.g., 10 milliwatts (mW) power consumption and 50 dB of dynamic range can be used. Such ADC may operate at relatively high speeds, e.g., between approximately 800 MHz and one gigahertz (GHz). In general, with a wider bandwidth (such as for satellite, WiFi or WiMax applications) SNR requirements are lower, e.g., for satellite an ADC with 50 dB SNR having a bandwidth of 30 MHz can be used. In today's technologies, as mentioned earlier, such a relatively low dynamic range ADC with high sampling speeds can be implemented in an area and power efficient manner. In contrast, with analog channel filtering of a conventional receiver, the overall filter area and power is significant as the ADC in following demodulator chips requires large attenuation at aliasing frequencies. Instead, the main filtering performed in various embodiments is done digitally with small area and power.

Still referring to FIG. 2, the digitized signals may be provided to corresponding DSPs 145$_a$ and 145$_b$. The primary function of these digital blocks may be to perform channel filtering digitally. By performing digital channel filtering, a passive and lightly constrained front end filter can be used, as discussed above. In addition to channel filtering, DSP 145 may perform other compensation operations such as DC offset cancellation, gain control, droop and group delay compensation, among possibly other compensation functions. That is, the satellite path is very sensitive to DC offsets, and thus small offset errors at the output of the receiver are desired. Thus whenever a gain change is made, the offset conditions change, and are to be compensated. Further, embodiments can simplify a design in terms of the ADC and DC offset and provide better I and Q matching and droop and group delay compensation.

The digitally processed signals output from DSPs 145 may be provided to corresponding DACs 155$_a$ and 155$_b$, for conversion back to the analog domain. In some implementations, these DACs may be implemented as current steering DACs. Because the residual output power is relatively low at the DAC input, the dynamic range of the DAC can be less than that of the front end ADC dynamic range which, as discussed above in one embodiment may be approximately 50 dB. Accordingly, in some embodiments a DAC of less than 8 bits, e.g., a 7-bit DAC may be provided. In some implementations this DAC can be clocked at lower frequencies than the ADC. For example, while the ADC can be clocked at 800 MHz, a clock rate as low as approximately 200 MHz can be used for the DAC. The resulting analog signals may be provided to output buffers 160$_a$ and 160$_b$. As seen, the buffers may in some implementations provide for some amount of gain control, e.g., via programmable coarse gain adjustments. The buffered analog complex signals may then be output off-chip, e.g., to a downstream demodulator.

In various embodiments, the overhead of including an ADC and DAC and providing a channel filter (and certain compensation circuitry) in a DSP can be smaller than a solution with a full analog baseband chain. At current process technologies of e.g., 0.13 microns (μm) or 90 nanometers (nm)), this overhead may be smaller, leading to power and area savings of, e.g., up to approximately 30%. Further, as process technologies advance to 65 nm and lower, digital filtering in accordance with an embodiment of the present invention may improve power/area budgets by 4× (compared to an implementation in 0.13 um technology), whereas an analog implementation does not improve power/area budgets as much. While shown with this particular implementation in the embodiment of FIG. 2, the scope of the present invention is not limited in this regard. For example, in other implementations, tuner 100 may be incorporated in a single chip tuner/demodulator. In such implementations, additional digital circuitry may be provided to perform digital demodulation on chip. To that end, signals output from DSPs 145 may be provided directly to such demodulation circuitry, which may be implemented in the same or separate DSP circuitry. In this way, the power consumed by conversion back to the analog domain and output buffering can be avoided.

Figure 3:
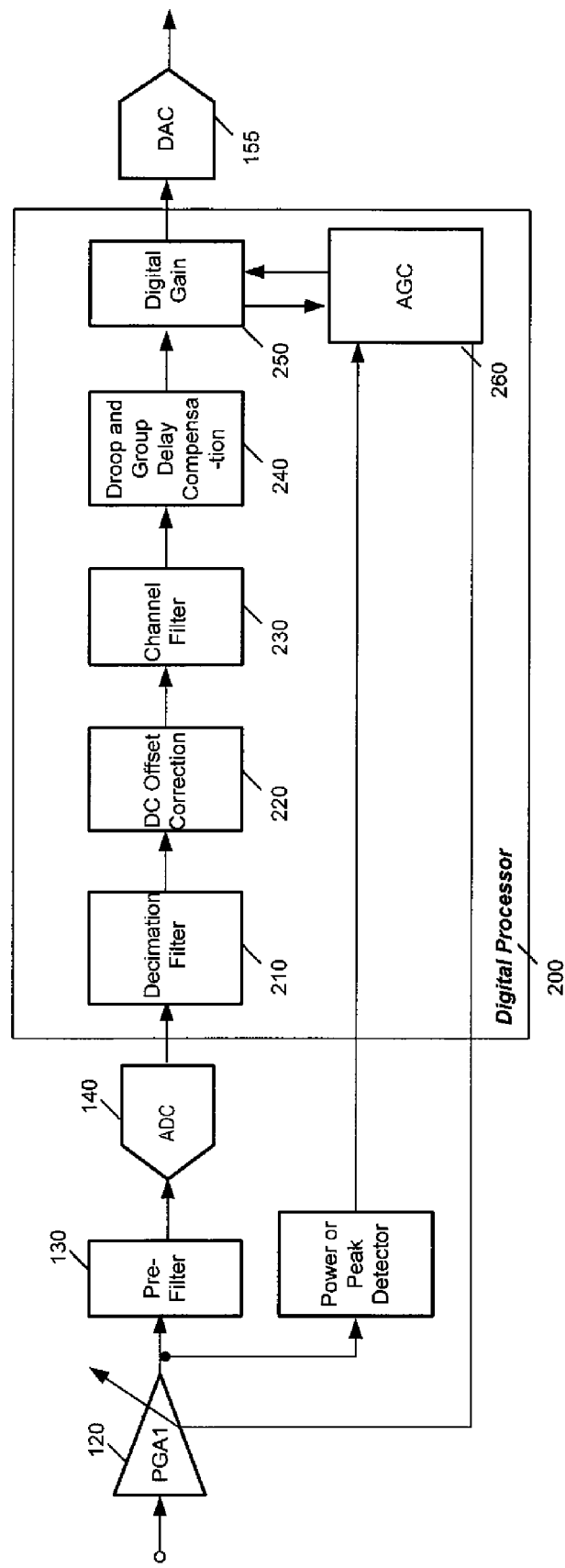
FIG. 3 is a block diagram of details of a digital processor in accordance with an embodiment of the present invention.

Referring now to FIG. 3, shown is a block diagram of details of a digital processor in accordance with an embodiment of the present invention. For ease of illustration a single signal path is shown, although in various embodiments the signal chain may be for handling complex signals. As shown in FIG. 3, DSP 200 may be part of a signal processing chain and may be used to perform various channel filtering and digital compensations such as may be performed in DSP 145 of FIG. 2. As seen, an incoming signal is gain controlled in a PGA 120 and pre-filtered via a pre-filter 130 (which as described above may be a passive anti-aliasing LPF). The signal may then be digitized in ADC 140, after which the incoming signals may be provided to digital processor 200, and more specifically to a decimation filter 210. Decimation filter 210 may be a sin $c^2$ decimation filter having a decimation ratio of 3×. The corresponding decimated signals can be provided to a DC offset correction block 220, which may perform digital DC offset compensation. The compensated signals are then provided to a channel filter 230 which in one embodiment may be a sixth-order inverse Chebyshev low pass filter with a programmable bandwidth. In one embodiment, the bandwidth may be programmable from approximately 4 MHz-34 MHz for a satellite implementation. The channel filtered signals may then be provided to a droop and group delay compensation block 240 that performs such compensation and provides compensated signals to a digital gain block 250. In various embodiments, the digital gain block may provide fine gain control, e.g., of relatively fine gain steps, e.g., 0.25 dB. In some embodiments, when the front end analog gain is updated in a first direction (e.g., gain is increased), fine gain adjustments in the other direction (e.g., of decreasing gain) can occur in digital gain block 250 to realize fine grain changes.

Still further, as seen in FIG. 3 an AGC block 260 may be provided to perform gain control. Information regarding incoming signal strength may be received in AGC block 260 from a power or peak detector 275, which may be coupled to receive the output of PGA 120. In turn, AGC block 250 may control both PGA 120 and digital gain block 250 based on this signal strength and a strength of the signal at gain block 250. The gain controlled signal may then be output to DAC 155 for conversion back to analog signals for output from the receiver.

While the above-described implementations are with respect to a single chip tuner, the scope of the present invention is not so limited. For example, other implementations may be used in a semiconductor device that includes other tuners for other types of television signals such as cable or terrestrial signals. Still further, the tuner may be implemented in a semiconductor device that also includes downstream circuitry such as a demodulator. For example, a single chip device may include on a single die both tuner and demodulator circuitry. In yet other implementations, a satellite tuner may be incorporated in a semiconductor device, e.g. a single die device that further includes a complete receiver path for cable and/or terrestrial signals.

Figure 4:
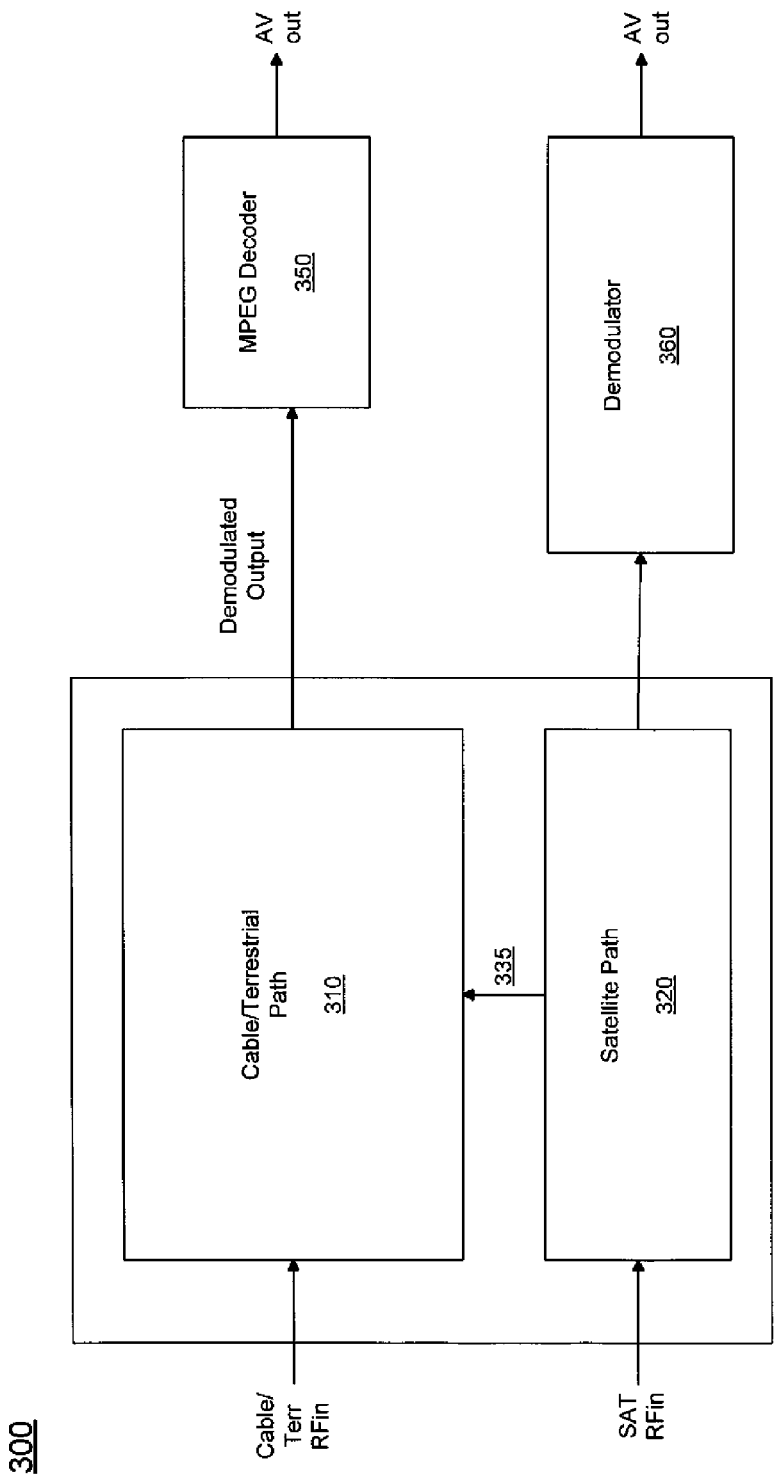
FIG. 4 is a high-level block diagram of a receiver in accordance with one embodiment of the present invention.

Referring now to FIG. 4, shown is a high-level block diagram of a receiver in accordance with one embodiment of the present invention. As shown in FIG. 4, receiver 300 includes a first path 310, which may be a full receiver chain for terrestrial/cable signals. This path may perform tuning operations as well as demodulator operations. In various implementations, path 310 may include both analog and digital circuitry to perform the various processing to obtain a demodulated signal output, which may be provided to further downstream circuitry, such as a separate IC 350 that may include, for example MPEG decoding circuitry.

In addition, as shown in FIG. 4, receiver 300 may further include a second path 320 that may include a satellite tuner which may take the form of tuner 100 shown in FIG. 2. In one implementation, a digital link 335 between the digital circuitry of the second path and the first path may be present to enable baseband complex digital signals to be provided directly to digital circuitry of the first path to enable demodulation of satellite signals to occur. In other implementations, such digital signals may be converted back to the analog domain for output from receiver 300 to separate downstream circuitry, such as to another integrated circuit 300 that includes demodulation circuitry. While the two paths may be completely separate, some embodiments may share circuitry, such as a synthesizer. While shown with this high level view in the embodiment of FIG. 4, the scope of the present invention is not limited in this regard. Thus in some embodiments, a digital intensive baseband receiver may be configured on the same die as a terrestrial/cable TV receiver, in which full digital demodulation is performed after analog processing.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
  a mixer to downconvert incoming radio frequency (RF) signals to complex second frequency signals;
  a first programmable gain amplifier (PGA) coupled to the mixer to receive and amplify a first complex second frequency signal;
  a second PGA coupled to the mixer to receive and amplify a second complex second frequency signal;
  a first passive filter coupled to the first PGA to filter the amplified first complex second frequency signal;
  a second passive filter coupled to the second PGA to filter the amplified second complex second frequency signal;
  a digital circuit including digitization circuitry to convert the filtered first and second complex second frequency signals into digital complex signals, a digital signal processor (DSP) coupled to the digitization circuitry to channel filter the digital complex signals, and conversion circuitry to convert the channel filtered digital complex signals to analog signals; and
  output buffer circuitry to buffer the analog signals for output from the apparatus.

2. The apparatus of claim 1, wherein the digital circuit is to further perform DC offset correction.

3. The apparatus of claim 2, wherein the digital circuit is to further perform droop compensation.

4. The apparatus of claim 3, wherein the digital circuit is to further perform group delay compensation.

5. The apparatus of claim 1, wherein the first and second PGAs are to be discretely controlled with a coarse gain step, and the digital circuit is to further perform gain control with a fine gain step.

6. The apparatus of claim 1, wherein the DSP includes:
  a decimation filter to decimate the digital complex signals;
  a DC offset compensation circuit to compensate for a DC offset;
  a channel filter to filter the DC offset compensation circuit output; and
  a droop and group delay compensation circuit to receive and compensate the channel filter output.

7. The apparatus of claim 1, wherein the apparatus comprises a satellite television tuner formed on a single semiconductor die.

8. The apparatus of claim 7, wherein the analog signals are to be provided to a second semiconductor die including a digital demodulator.

9. The apparatus of claim 1, wherein the incoming RF signals are wireless local area network signals.

10. A satellite television tuner comprising:
  an analog front end including:
    a mixer to downconvert incoming radio frequency (RF) signals to complex second frequency signals;
    a first programmable gain amplifier (PGA) coupled to the mixer to receive and amplify a first complex second frequency signal;
    a second PGA coupled to the mixer to receive and amplify a second complex second frequency signal;
    a first second-order anti-aliasing filter coupled to the first PGA to filter the amplified first complex second frequency signal; and
    a second second-order anti-aliasing filter coupled to the second PGA to filter the amplified second complex second frequency signal;
  an analog-to-digital converter (ADC) to convert the filtered first and second complex second frequency signals into digital complex signals, the ADC having a resolution less than approximately 9 bits;

a digital signal processor (DSP) coupled to the ADC and including a decimation filter to decimate the digital complex signals, a DC offset compensation circuit to compensate for a DC offset, a channel filter to filter the DC offset compensation circuit output, and a droop and group delay compensation circuit to receive and compensate the channel filter output;

a digital-to-analog converter (DAC) coupled to the DSP to convert the compensated channel filter output to analog signals, the DAC having a resolution less than approximately 8 bits; and an analog back end including an output buffer to buffer the analog signals for output from the satellite television tuner, wherein the satellite television tuner is formed on a single semiconductor die.

11. The satellite television tuner of claim 10, wherein the single semiconductor die further includes a terrestrial tuner and a digital demodulator.

12. The satellite television tuner of claim 11, further comprising a link coupled between the DSP and the digital demodulator to forward the channel filter output to the digital demodulator.

13. The satellite television tuner of claim 10, wherein an area of the first and second second-order anti-aliasing filters is smaller than an area of an analog channel filter of an analog tuner path of a second satellite television tuner having an analog baseband chain, the second satellite television tuner not including an ADC, DSP, or DAC.

14. The satellite television tuner of claim 13, wherein an area of the ADC, the DSP, the DAC, and the first and second second-order anti-aliasing filters of the satellite television tuner is less than an area of the analog channel filter of the second satellite television tuner.

15. The satellite television tuner of claim 14, wherein a power consumption of the ADC, the DSP, the DAC, and the first and second second-order anti-aliasing filters of the satellite television tuner is less than a power consumption of the analog channel filter of the second satellite television tuner.

16. A method comprising:
   downconverting an incoming radio frequency (RF) signal to first and second complex second frequency signals in a complex mixer of a satellite tuner, the satellite tuner formed on a single semiconductor die and having an analog front end, digital circuitry, and an analog back-end;
   filtering the first complex second frequency signal in a first passive filter;
   filtering the second complex second frequency signal in a second passive filter;
   converting the filtered first and second complex second frequency signals into first and second digital complex signals;
   channel filtering the first and second digital complex signals in a digital signal processor (DSP);
   converting the channel filtered first and second digital complex signals to analog signals; and
   outputting the analog signals from the satellite tuner.

17. The method of claim 16, further comprising performing DC offset correction on the first and second digital complex signals in the digital signal processor.

18. The method of claim 17, further comprising performing group delay compensation on the first and second digital complex signals in the digital signal processor.

19. The method of claim 18, further comprising performing droop compensation on the first and second digital complex signals in the digital signal processor.

20. The method of claim 16, further comprising discretely controlling a programmable gain amplifier of the analog front end using a gain control logic of the DSP.

* * * * *